United States Patent
Ozaki et al.

(10) Patent No.: US 7,334,427 B2
(45) Date of Patent: Feb. 26, 2008

(54) EJECTOR WITH TAPERED NOZZLE AND TAPERED NEEDLE

(75) Inventors: Yukikatsu Ozaki, Gamagori (JP);
Tadashi Hotta, Okazaki (JP);
Hirotsugu Takeuchi, Nagoya (JP)

(73) Assignees: Nippon Soken, Inc., Nishio (JP);
DENSO Corporation, Kariya (JP)

( * ) Notice: Subject to any disclaimer, the term of this patent is extended or adjusted under 35 U.S.C. 154(b) by 608 days.

(21) Appl. No.: 10/791,650

(22) Filed: Mar. 2, 2004

(65) Prior Publication Data
US 2004/0172966 A1   Sep. 9, 2004

(30) Foreign Application Priority Data
Mar. 5, 2003 (JP) .............................. 2003-058508

(51) Int. Cl.
*F25B 1/06* (2006.01)
*F25B 41/06* (2006.01)
(52) U.S. Cl. .......................................... 62/500; 62/527
(58) Field of Classification Search ................ 62/116, 62/191, 268, 500, 503, 512, 527; 137/111, 137/114
See application file for complete search history.

(56) References Cited

U.S. PATENT DOCUMENTS

| | | | | |
|---|---|---|---|---|
| 3,701,264 | A | * | 10/1972 | Newton ........................ 62/191 |
| 6,138,456 | A | * | 10/2000 | Garris .......................... 60/649 |
| 6,550,265 | B2 | * | 4/2003 | Takeuchi et al. ............ 62/324.2 |
| 6,574,987 | B2 | * | 6/2003 | Takeuchi et al. ............... 62/500 |
| 6,701,715 | B2 | * | 3/2004 | Anderson et al. .............. 60/782 |
| 6,706,438 | B2 | * | 3/2004 | Sahoda et al. ................. 429/34 |
| 6,729,158 | B2 | * | 5/2004 | Sakai et al. .................... 62/500 |
| 2002/0000095 | A1 | | 1/2002 | Takeuchi |
| 2002/0106547 | A1 | * | 8/2002 | Sugawara et al. ............. 429/34 |
| 2003/0205049 | A1 | * | 11/2003 | Anderson et al. .............. 60/782 |
| 2004/0007013 | A1 | | 1/2004 | Takeuchi |

FOREIGN PATENT DOCUMENTS

| | | | |
|---|---|---|---|
| CN | 1332344 | | 1/2002 |
| EP | 0889244 | | 1/1999 |
| GB | 2207952 A | * | 2/1989 |
| JP | 5-312421 | | 11/1993 |
| JP | 10-205898 | | 8/1998 |

* cited by examiner

*Primary Examiner*—Mohammad M. Ali
(74) *Attorney, Agent, or Firm*—Harness, Dickey & Pierce, PLC

(57) ABSTRACT

In an ejector, a nozzle includes a nozzle tapered section having an inner passage with a radial dimension reduced toward a nozzle outlet port, and a needle having a needle tapered section disposed in the inner passage. The needle tapered section has a cross sectional area reduced toward a downstream end of the needle, and the downstream end of the needle is positioned at a downstream side with respect to the nozzle outlet port. In addition, the nozzle tapered section has a taper angle ($\phi 1$) which is equal to or greater than a taper angle ($\phi 2$) of the needle tapered section. Therefore, a boundary face on the outside of a nozzle jet flow becomes in a balanced natural shape, and is controlled in accordance with an operating condition. Thus, the ejector cycle can be operated while keeping high efficiency, regardless of the thermal load of the ejector cycle.

13 Claims, 12 Drawing Sheets

EJECTOR WITH TAPERED NOZZLE AND TAPERED NEEDLE

CROSS REFERENCE TO RELATED APPLICATION

This application is based on Japanese Patent Application No. 2003-58508 filed on Mar. 5, 2003, the disclosure of which is incorporated herein by reference.

FIELD OF THE INVENTION

The present invention is related to an ejector which is a kinetic pump for transferring a fluid by using entrainment of a high-speed jet flow of a driving fluid. The ejector is constructed with a tapered nozzle and a tapered needle, and is suitably used for a vapor compression refrigerant cycle (ejector cycle) where the ejector is used as a pumping unit for circulating refrigerant (e.g., JIS Z 8126 2.2.2.3).

BACKGROUND OF THE INVENTION

Conventionally, a Laval nozzle is used in an ejector cycle for increasing a flow speed of a fluid jetted from the Laval nozzle. When the flow speed of the fluid jetted from the Laval nozzle is increased, pumping effect of the ejector is enhanced by entrainment of the high-speed jet flow. The Laval nozzle has a throat section and a diffuser section downstream of the throat section. The throat section is the most reduced area in a fluid passage in the Laval nozzle. The diffuser section has a passage sectional area expanding toward downstream in the fluid passage from the throat section (e.g., JP-A-10-205898 and JP-A-5-312421).

In an ideal Laval nozzle, refrigerant (fluid) is throttled as flowing toward the throat section. The flow speed of the refrigerant is increased, and becomes mach 1 (critical condition) at the throat section. The refrigerant after passing through the throat section is boiled while expanding in the diffuser section, so that the flow speed of the refrigerant exceeds mach 1 in the diffuser section.

Further, a variable throttle valve can be provided at an upstream side of the nozzle for changing a refrigerant flow rate in the nozzle, so as to adapt to a change of an operating condition in the ejector cycle. Alternatively, an outlet passage area of the nozzle is changed, so as to adapt to a change of the operating condition in the ejector cycle.

The refrigerant flow rate passing through the nozzle substantially proportionally changes in accordance with a passage area of the throat section. Therefore, the diffuser section and the throat section must be precisely manufactured in the Laval nozzle. Thus, tolerance of the diffuser section and the throat section has to be strictly controlled. Especially, the tolerance of the diffuser section and the throat section has to be controlled within 100 µm in the Laval nozzle used in a home air conditioner or a vehicle air conditioner. Therefore, the Laval nozzle is difficult to be manufactured.

Besides, a flow characteristic of the Laval nozzle depends on a passage sectional area in the throat section. An appropriate expansion condition at the downstream side of the throat section depends on a passage sectional area of a nozzle outlet port. Therefore, if a refrigerating capacity of the ejector cycle is changed, i.e., specification of refrigerating capacity or a design pressure condition is changed, the Laval nozzle needs to be manufactured in accordance with the changing of the refrigerating capacity of the ejector cycle.

Therefore, when multiple kinds of ejector cycles are respectively constructed depending on various refrigerating capacities and various operating conditions, special nozzles need to be manufactured in accordance with each specification, such as the refrigerating capacity and the operating condition. That is, capital investment for constructing the ejector cycles is further needed, and additional manpower is also needed for manufacturing many kinds of the nozzles, so that manufacturing costs of ejector cycles, i.e., nozzles, are increased.

In general, the Laval nozzle is used in a refrigerator when fluctuation of a thermal load in the refrigerator is relatively small. In this case, the balance of the ejector cycle depends on a fixed characteristic of the Laval nozzle. Here, the Laval nozzle is initially designed based on a specific condition, such as a maximum thermal load condition. However, when the thermal load is changed, a pressure condition is also changed. In this case, the expansion condition of refrigerant is changed to be a deficient condition or an excessive condition.

As shown in FIG. 19A, when inlet pressure of the Laval nozzle is PH1, nozzle outlet pressure becomes an appropriate outlet pressure PL. In this case, refrigerant appropriately expands in the diffuser section of the Laval nozzle. However, when inlet pressure of the Laval nozzle becomes PH2, refrigerant does not sufficiently expand in the Laval nozzle. In this case, the nozzle outlet pressure does not decrease to the appropriate outlet pressure PL, and the nozzle efficiency is decreased. As shown in FIG. 19B, when outlet pressure of the Laval nozzle is PL3, pressure of refrigerant decreases from PH to PL3. In this case, refrigerant appropriately expands in the diffuser section of the Laval nozzle. However, when outlet pressure of the Laval nozzle becomes PL4, pressure of refrigerant does not decrease from PH to PL4. In this case, refrigerant does not sufficiently expand in the Laval nozzle, and the nozzle efficiency is decreased. Therefore, the nozzle efficiency decreases in the Laval nozzle, when either the inlet pressure or the outlet pressure is changed.

Alternatively, in a variable nozzle where the end of the needle valve is located on an upstream side of the throat section, the cross-sectional area of the fluid passage on the downstream side of the throat section cannot be changed. As shown in FIG. 20, as the refrigerant passage sectional area in the throat section (i.e., throttle area) is reduced, pressure at the throat section decreases. When the throttle area is small, as in the case where the pressure changes shown by □ and ♦, the pressure at the throat section once decreases, however, the pressure increases again toward the nozzle outlet. This pressure decreasing and increasing is caused due to an excessive expansion between the throat section and the nozzle outlet. In this case, refrigerant speed discharged from the nozzle cannot be increased up to the sound speed, and efficiency of the ejector decreases.

FIG. 21 is a graph showing a pressure distribution in the diffuser section of the nozzle and a dimensionless number D (i.e., passage sectional area in the diffuser section/passage sectional area in the throat section), when the throttle area (i.e., passage area in the throat section) is changed. In FIG. 21, carbon dioxide is used for the refrigerant, and temperature condition and pressure condition are constant in the nozzle inlet. The relationship shown in FIG. 21 can be applied to a flow over the sound speed, and cannot be applied to a flow condition in which pressure increases in the nozzle because a shock wave is generated due to an excessive expansion.

As shown in FIG. 21, even the cross-sectional area in the throat section (i.e., throttle area) is changed, the relationship between the pressure and the dimensionless number D does not largely change. Specifically, the relationships shown by the marks, such as ▲, ■, □, ●, show similar characteristic, when the throttle area is changed. However, when the throttle area is reduced and the nozzle outlet area is not changed, the dimensionless number D (i.e., passage sectional area in the nozzle outlet/passage sectional area in throttle) becomes large at the nozzle outlet. In this case, if the refrigerant speed is over the sound speed and the refrigerant expands at the outlet of the nozzle, the pressure of the refrigerant becomes small according to the relationship in FIG. 21. Therefore, the refrigerant may excessively expand, because pressure of the refrigerant is decreased at the outlet of the nozzle. Accordingly, the nozzle efficiency of the conventional variable nozzle decreases.

SUMMARY OF THE INVENTION

In view of the foregoing problems, it is an object of the present invention to provide an ejector having a nozzle which can effectively improve nozzle efficiency regardless of an operation condition. It is another object of the present invention to provide an ejector which effectively reduces its manufacturing cost while improving a nozzle efficiency can be improved.

According to the present invention, an ejector for pumping a fluid by entrainment of a high-speed fluid includes a nozzle and a needle. The nozzle includes a fluid outlet port from which the high-speed fluid is jetted, and a nozzle tapered section located at an upstream side of the fluid outlet port. The nozzle tapered section has an inner passage with a radial dimension reduced toward the fluid outlet port. Further, a needle has a needle tapered section disposed in the inner passage of the nozzle, and the needle tapered section has a cross sectional area reduced toward a downstream end of the needle. In the ejector, the downstream end of the needle is positioned at a downstream side with respect to the fluid outlet port, and the nozzle tapered section has a taper angle ($\phi$1) which is equal to or larger than a taper angle ($\phi$2) of the needle tapered section.

Thus, a nozzle jet flow along an outer peripheral surface of a protruded part of the needle, protruded from the fluid outlet port of the nozzle, can be formed, and a boundary face of the nozzle jet flow of the fluid jetted from the fluid outlet port of the nozzle has a balanced shape. Further, the balanced shape is determined and is changed in accordance with a pressure difference between a pressure difference of the high-speed fluid and the pumped fluid. Therefore, the high-speed fluid jetted from the fluid outlet port of the nozzle can perform an expansion near an appropriate expansion. Further, because it is unnecessary to provide a diffuser section in the nozzle, the manufacturing process of the nozzle can be made simple while nozzle efficiency can be improved.

According to the present invention, the nozzle includes a straight section extending from the fluid outlet port to an upstream side by a predetermined distance. In this case, the straight section has an inner radial dimension that is substantially constant, and the straight section is arranged at a direct downstream side of the nozzle tapered section. Further, the needle is disposed in the nozzle to define a fluid passage therebetween, the fluid passage has a throttle section at which a cross-sectional area of the fluid passage becomes smallest, and the straight section and the nozzle tapered section are connected to each other at the throttle section. Because the straight section is formed in the nozzle, the nozzle can be readily manufactured. Further, even when a diffuser section is not provided in the nozzle, the diffuser function can be obtained in the nozzle due to the straight portion and the needle of the present invention.

For example, the needle tapered section includes a root section and an end section located downstream of the root section. In this case, it is possible to set a taper angle ($\phi$1) of the end section of the needle tapered section to be different from a taper angle ($\phi$2) of the root section of the needle tapered section. Further, the needle tapered section can have a downstream end surface that is formed in one of a substantially hemispherical shape and a flat shape. In addition, the needle can be displaced in an axial direction of the needle by using an actuator.

When the ejector is used for a vapor compression refrigerant cycle, the nozzle jet flow is changed in accordance with an operation condition of the cycle, and the nozzle efficiency can be effectively improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

The first embodiment of the present invention will be now described with reference to FIGS. 1-5A. In the first embodiment, an ejector 40 of the present invention typically used in an ejector cycle for a vehicle air conditioner. The ejector cycle shown in FIG. 1 uses carbon dioxide as refrigerant.

Figure 1:
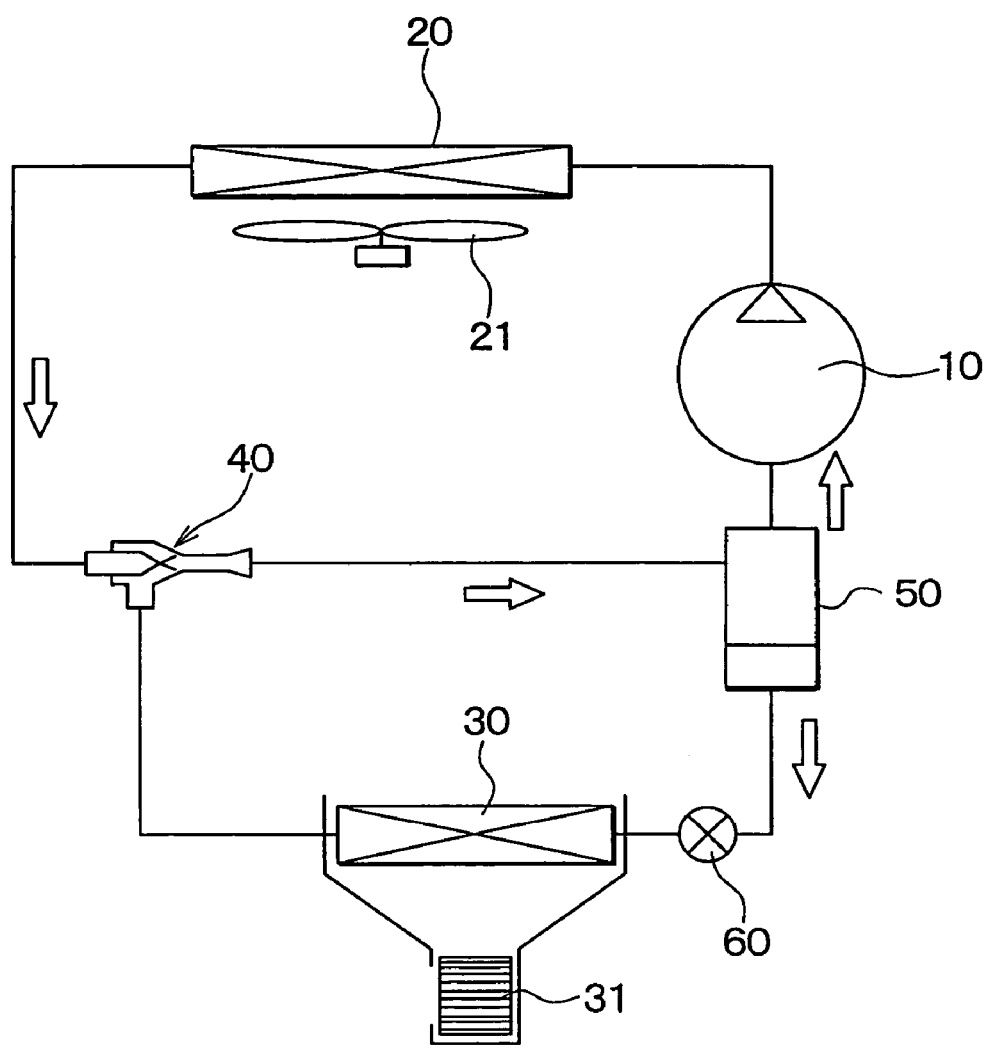
FIG. 1 is a schematic diagram showing a vapor-compression refrigerant cycle (ejector cycle) in which an ejector of the present invention is used.

In FIG. 1, a compressor 10 for compressing refrigerant is a variable displacement compressor. The compressor 10 is driven by a vehicle engine, so as to draw and compress refrigerant. A discharge amount of refrigerant from the compressor 10 is controlled, so that temperature and pressure in the evaporator 30 is controlled within a predetermined range. The compressor 10 can be an electrically driven compressor. In this case, a refrigerant flow amount discharged by the compressor 10 can be controlled by controlling a rotation speed of the compressor 10.

A radiator 20 is a high-pressure side heat exchanger. Heat exchange is performed between refrigerant discharged by the compressor 10 and exterior air, so that the refrigerant discharged from the compressor 10 is cooled in the radiator 20. An evaporator 30 is a low-pressure side heat exchanger. Heat exchange is performed between liquid-phase refrigerant and air to be blown into a passenger compartment in the evaporator 30, so that the liquid-phase refrigerant is evaporated in the evaporator 30. The air passing through the evaporator 30 is cooled and blown into the passenger compartment. In this embodiment, carbon dioxide is used for the refrigerant in the ejector cycle, and discharge pressure of the compressor 10 can be set at a pressure higher than a critical pressure of the refrigerant. The refrigerant temperature is decreased in the radiator 20, so that enthalpy of the refrigerant is decreased without condensation (phase change) of the refrigerant. When HFC134a is used for the refrigerant, the discharge pressure of the compressor 10 can be set at a pressure less than the critical pressure of the refrigerant. In this case, the refrigerant condenses in the radiator 20 while enthalpy of the refrigerant is decreased.

High-pressure refrigerant flowing from the radiator 20 is decompressed and expanded in the ejector 40, while drawing vapor-phase refrigerant (low-pressure refrigerant) evaporated in the evaporator 30. Further, the ejector 40 converts expansion energy of the refrigerant into pressure energy, so as to increase suction pressure of the compressor 10.

Refrigerant is discharged form the ejector 40, and flows into a gas-liquid separator 50, so that the refrigerant flowing to the gas-liquid separator 50 is separated into gas refrigerant and liquid refrigerant. The liquid refrigerant is accumulated in the gas-liquid separator 50. A gas-refrigerant outlet port of the gas-liquid separator 50 is connected with a suction port of the compressor 10, so that gas refrigerant-in the gas-liquid separator 50 is supplied to the compressor 10. A liquid-refrigerant outlet port of the gas-liquid separator 50 is connected with an inlet port of the evaporator 30, so that liquid refrigerant in the gas-liquid separator 50 is supplied to the evaporator 30. A decompression unit 60 is provided for decompressing liquid refrigerant flowing out of the gas-liquid separator 50. A fan 21 blows cooling air (outside air) toward the radiator 20. A fan 31 blows air toward the evaporator 30 for cooling the air in the evaporator 30. The air cooled in the evaporator 30 is blown into the passenger compartment.

Figure 2:
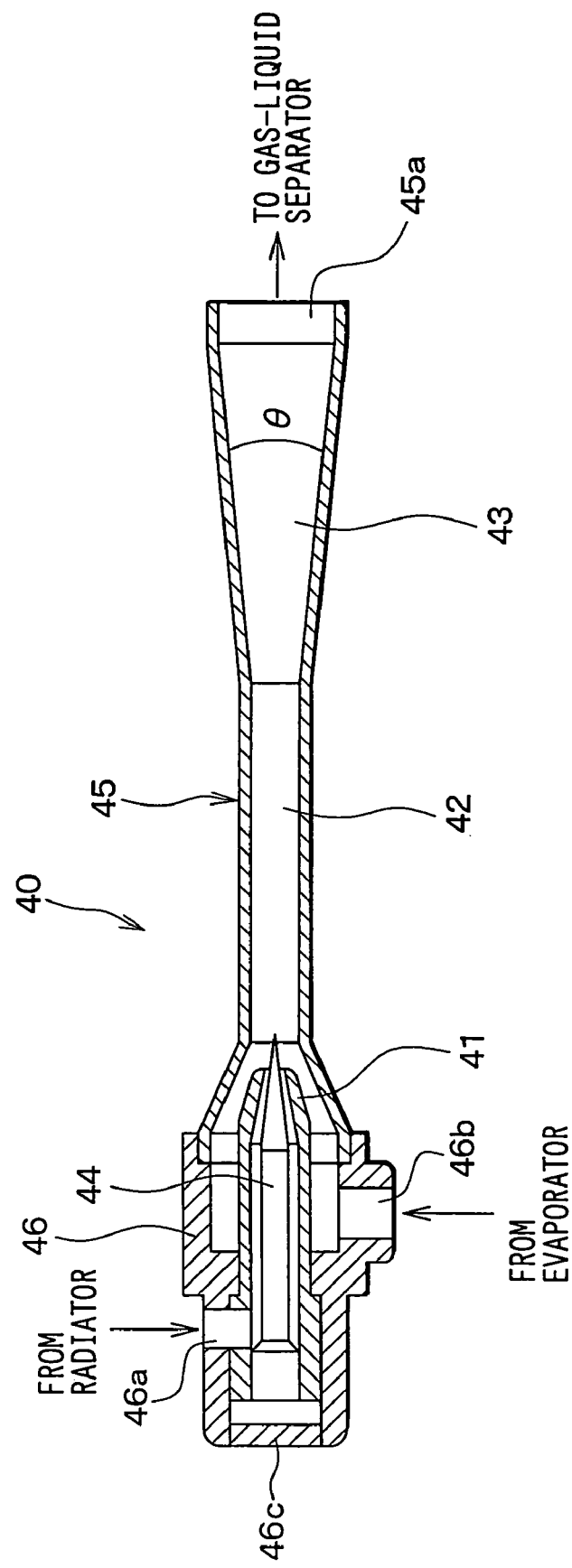
FIG. 2 is a schematic cross-sectional view showing an ejector according to a first embodiment in the present invention.

Next, the structure of the ejector 40 is described in detail. As shown in FIG. 2, the ejector 40 is constructed with a nozzle 41, a mixing section 42, a diffuser 43 and a needle 44 or the like. The nozzle 41 isentropically decompresses and expands the high-pressure refrigerant flowing into the nozzle 41 from the radiator 20. The nozzle 41 converts pressure energy of the high-pressure refrigerant into velocity energy of the high-pressure refrigerant. The mixing section 42 mixes refrigerant jetted from the nozzle 41 and gas refrigerant drawn from the evaporator 30 by high-speed refrigerant flow jetted from the nozzle 41. The diffuser 43 increases refrigerant pressure while converting the velocity energy of the high-speed refrigerant jetted from the nozzle 41 into the pressure energy, while mixing refrigerant jetted from the nozzle 41 and refrigerant drawn from the evaporator 30. The needle 44 is formed in a conical tapered shape, where the axial cross-sectional area of the needle 44 decreases toward a downstream tip end of the needle 44.

The nozzle 41 and the needle 44 are made of a metallic material, such as stainless steel, for preventing erosion and corrosion due to cavitation generated when the refrigerant expands.

A hosing 45 is an approximately cylindrical member constructing the mixing section 42 and the diffuser 43. An outlet port 45a of the diffuser 43 is connected with an inlet port 76 of the gas-liquid separator 50.

A block 46 is made of a metallic material, and is formed to receive the nozzle 41. The block 46 has a high-pressure refrigerant inlet 46a connected with a discharge side of the radiator 20 and a low-pressure refrigerant inlet 46b connected with an outlet of the evaporator 30. The housing 45 and the block 46 are connected to each other by welding or soldering. The housing 45 and the block 46 are made of aluminum, stainless steel, brass or the like.

The needle 44 is coaxially press-fixed to the nozzle 41. The nozzle 41 receiving the needle 44 is press-fixed to the block 46, so that the needle 44 and the nozzle 41 are attached to the block 46. The nozzle 41 is press-inserted into a hole of the block 46, and the hole of the block 46 is plugged with a lid 46c. The lid 46c is used as a holding unit of the needle 44.

The refrigerant flowing from the nozzle 41 and the refrigerant flowing from the evaporator 30 into the ejector 40 are mixed in the mixing section 42, while the sum of kinetic momentum of the refrigerant flow jetted from the nozzle 41 and kinetic momentum of the refrigerant flow drawn from the evaporator 30 into the ejector 40 are conserved. Therefore, static pressure of refrigerant increases in the mixing section 42 of the ejector 40.

Besides, the cross-sectional area of the refrigerant passage gradually increases in the diffuser 43, so that dynamic pressure of refrigerant is converted into static pressure. Therefore, refrigerant pressure is increased in both of the mixing section 42 and the diffuser 43 (pressurizing section) in the ejector 40.

It is preferable that refrigerant pressure is increased in the mixing section 42 while total kinetic momentum of the two kinds of refrigerant flows is conserved. Here, the two kinds of refrigerant flows are the refrigerant flow jetted from the nozzle 41 and the refrigerant flow drawn from the evaporator 30. Energy of both the refrigerant flows is conserved in the diffuser 43 in an ideal ejector.

Figure 3:
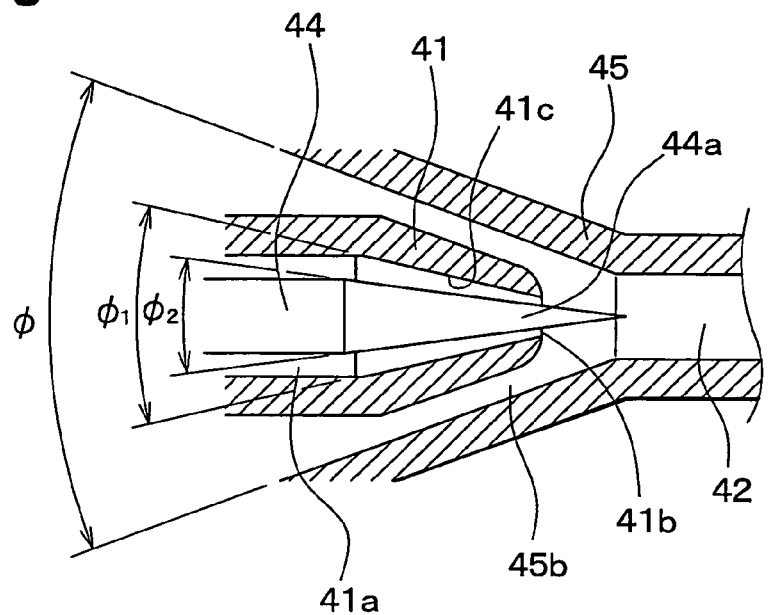
FIG. 3 is an enlarged schematic cross-sectional view showing a needle and a nozzle in the ejector according to the first embodiment.

As shown in FIG. 3, the nozzle 41 is a tapered nozzle in which a conical-shaped tapered nozzle section 41c is formed. Refrigerant passage area in the tapered nozzle section 41c decreases toward a nozzle outlet port 41b (fluid outlet port). An outer peripheral wall of the tapered nozzle section 41c is also formed in a conical shape, so as to be substantially in parallel with an inner peripheral wall of the tapered nozzle section 41c.

A conically tapered section 44a is formed in a tip end section of the needle 44 located in the tapered nozzle section 41c of the nozzle 41. The conically tapered section 44a is formed in a conical shape in which cross-sectional area of the conically tapered section 44a decreases toward its tip end located on the side of the mixing section 42. The tip end of the needle 44 reaches out of the nozzle outlet (fluid outlet or throat section) 41b on the downstream side of the refrigerant flow.

A taper angle $\phi 1$ of the tapered nozzle section 41c is set to be equal or greater than a taper angle $\phi 2$ of the conically tapered section 44a of the needle 44. A refrigerant passage 41a is formed between the inner peripheral surface of the tapered nozzle section 41c and the outer peripheral surface of the conically tapered section 44a of the needle 44. Further, the refrigerant passage 41 is formed such that the cross-sectional area of the refrigerant passage 41a becomes in minimum at the nozzle outlet port 41b. That is, in the first embodiment, the nozzle outlet port 41b is the throat section of the nozzle 41 where a radial inner dimension is most reduced, and is also a throttle section where the passage sectional area of the refrigerant passage 41a is most reduced.

Next, operation of the ejector cycle is described in detail. Refrigerant is compressed in the compressor 10 and is discharged from the compressor 10 to the radiator 20 to be circulated in the ejector cycle 1. The refrigerant discharged from the compressor 10 is cooled in the radiator 20. The refrigerant cooled in the radiator 20 is isentropicaly decompressed and expanded in the nozzle 41 of the ejector 40, and flows into the mixing section 42 at a speed higher than the sound speed.

The high-speed refrigerant flowing from the nozzle 41 into the mixing section 42 has a pumping operation due to entrainment of the high-speed refrigerant flow. Refrigerant evaporated in the evaporator 30 is drawn into the mixing section 42 by the pumping operation of the high-speed refrigerant. Thus, refrigerant at the low-pressure side in the ejector cycle is circulated in this order of the gas-liquid separator 50→the decompression unit 60→the evaporator 30→the ejector 30 (pressurizing section)→the gas-liquid separator 50.

Refrigerant (suction flow) drawn from the evaporator 30 and refrigerant (driving flow) discharged from the nozzle 41 are mixed in the mixing section 42, and dynamic pressure of both the suction flow and the driving flow are converted into static pressure in the diffuser 43. The mixed refrigerant in the mixing section 42 and the diffuser 43 flows into the gas-liquid separator 50.

An inlet angle $\phi$ in FIG. 3 is a taper angle of an inner wall surface of the housing 45, for defining a flow passage where the low-pressure refrigerant drawn from the evaporator 30 flows. When the inlet angle $\phi$ becomes large, a component of velocity in the axial direction of the low-pressure refrigerant becomes small. Here, the component of velocity in the axial direction of the low-pressure refrigerant is a component of velocity in the jetting direction of the low-pressure refrigerant in the nozzle 41. Therefore, a pressurizing degree in the ejector 40 becomes small. It is preferable that the inlet angle $\phi$ is set equal to or less than 40° according to inventors' studies.

Figure 4:
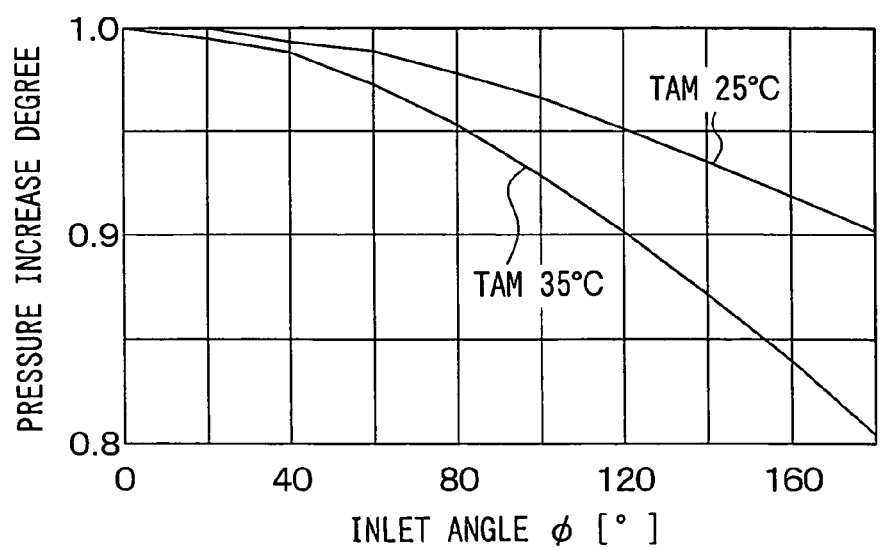
FIG. 4 is a graph showing a relationship between an inlet angle $\phi$ of a low-pressure refrigerant flow and a pressure increase degree of the refrigerant in the ejector according to the first embodiment.

FIG. 4 shows a calculation data of a pressurizing degree (i.e., pressure increasing degree) of the ejector 40. In FIG. 4, a pressurizing degree of the ejector 40 when the inlet angle $\phi$ is 0° is set as a standard value (i.e., 1.0). As premises of the calculation in FIG. 4, the refrigerant used in the refrigerant cycle (ejector cycle) is carbon dioxide, and exterior temperature (TAM) is set at 25° C. and 35° C. According to the calculation data, pressurizing degree decreases as the inlet angle $\phi$ increases. The pressurizing degree relatively slightly decreases, while the inlet angle $\phi$ is between 0° and about 40°. However, the pressurizing degree rapidly decreases while the inlet angle $\phi$ is greater than about 40°.

Figure 5A:
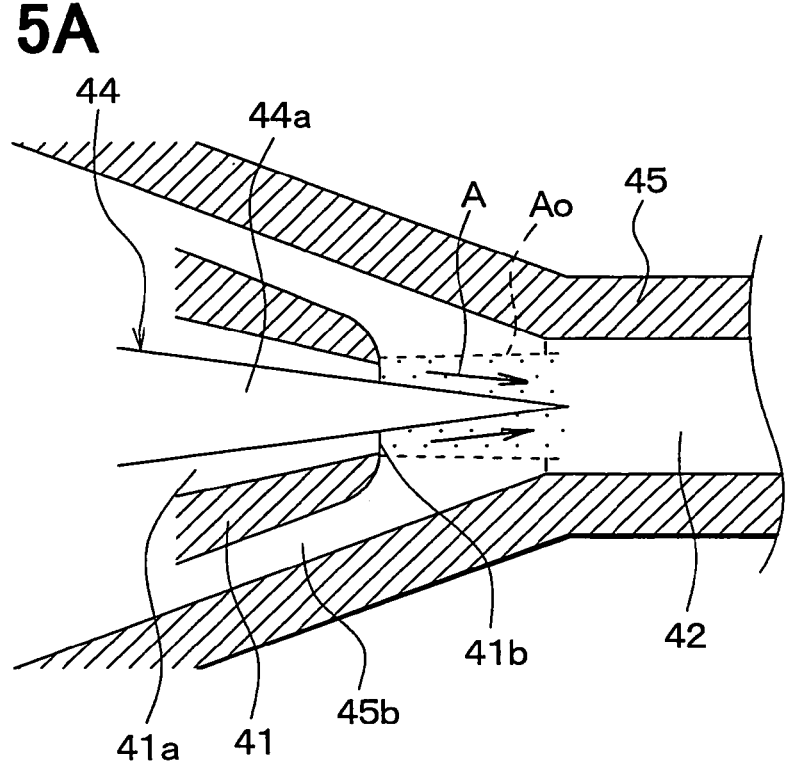
FIGS. 5A and 5B are enlarged schematic cross-sectional views showing jet flows A of refrigerant in the ejector when pressure difference between a pressure of the high-pressure jet flow A and a pressure of the low-pressure refrigerant flow is changed.
Figure 5B:
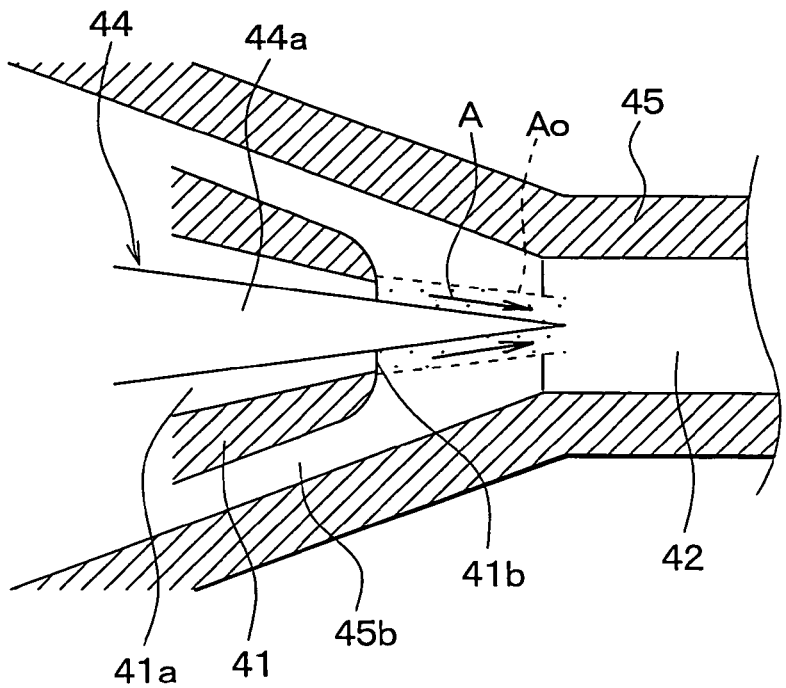

According to the first embodiment, the conically-tapered section 44a of the needle 44 protrudes from the nozzle outlet 41d, so as to reach to the side of the mixing section 42. As shown in FIGS. 5A and 5B, the high-pressure refrigerant flows into the refrigerant passage 41a (i.e., peripheral passage around the needle 44), and is discharged from the nozzle outlet port 41b. The refrigerant discharged from the nozzle outlet port 41b flows along with the surface of the needle 44 (i.e., conically tapered section 44a) by inertial force and a Coanda effect or the like.

The cross-sectional area of the conically tapered section 44a decreases toward the downstream side of the refrigerant flow. Therefore, a jet flow (nozzle jet flow A) discharged from the nozzle outlet port 41b of the nozzle 41 gradually diffuses toward the axis of the nozzle 41 as the refrigerant flows to the downstream side.

On the contrary, a boundary face A0, which is an outer periphery of the nozzle jet flow A, diffuses to a position where the nozzle jet flow A and the low-pressure refrigerant flowing around the nozzle jet flow A balance with each other. Here, the low-pressure refrigerant flowing around the nozzle jet flow A is the refrigerant drawn from the evaporator 30. When a large amount of refrigerant flows into the nozzle 41, a pressure difference between the nozzle jet flow A and the low-pressure refrigerant flowing around the nozzle jet flow A becomes larger. In this case, as shown in FIG. 5A, the diameter of the boundary face A0 is widened. On the contrary, when a small amount of refrigerant flows into the nozzle 41, the pressure difference between the nozzle jet flow A and the low-pressure refrigerant flow becomes small.

In this case, as shown in FIG. 5B, the diameter of the boundary face A0 is reduced.

The refrigerant flowing into the nozzle 41 is throttled toward the nozzle outlet port 41b in the nozzle 41, and the flow speed of the refrigerant is increased toward the nozzle outlet port 41b of the nozzle 41. Thus, the refrigerant flowing in the nozzle 41 becomes the critical condition at the nozzle outlet port 41b, and the speed of the refrigerant becomes mach 1 at the nozzle outlet port 41b.

The nozzle jet flow A discharged from the nozzle outlet port 41b is expanded and boiled, so that flow speed of the refrigerant discharged from the nozzle outlet port 41b exceeds mach 1 (i.e., supersonic speed). That is, the speed of the refrigerant discharged from the nozzle outlet port 41b is increased up to the supersonic speed, similarly to a case where the Laval nozzle is used in the ejector 40.

In the first embodiment, the boundary face A0 of the nozzle jet flow A has a balanced shape in an appropriate expansion mode. The balanced shape is determined and is changed in accordance with the pressure difference between the low-pressure refrigerant flow from the evaporator 30 and the nozzle jet flow A. On the contrary, the shape of the diffuser section of the Laval nozzle is a predetermined fixed shape. Therefore, in the case where the Laval nozzle is used, refrigerant discharged from a throat section in the Laval nozzle does not necessarily expands in an appropriate expansion mode.

In the first embodiment, the boundary face A0 of the nozzle jet flow A is self-controlled and naturally varies in the ejector 40. Therefore, in the first embodiment, the nozzle jet flow A can rapidly expand in the appropriate expansion mode. On the contrary, in the Laval nozzle, an expansion of refrigerant from the nozzle 41 is restricted by the shape of the diffuser section, so that a nozzle jet flow A is not necessarily able to expand in the appropriate expansion mode.

According to the first embodiment, for example, in a case where pressure of low-pressure refrigerant flow from the evaporator 30 is changed while the inlet pressure of the nozzle 41 and inlet temperature of the nozzle 41 are constant, when the pressure of the low-pressure refrigerant flow decreases, the pressure difference between the nozzle jet flow A and the low-pressure refrigerant flow increases so that the jet flow is widened. In contrast, when the pressure of the low-pressure refrigerant flow increases, the pressure difference between the nozzle jet flow A and the low-pressure refrigerant flow decreases, so that the jet flow is difficult to be widened.

As described above, in the first embodiment, the nozzle jet flow A is set to be along with the protruding part of the needle 44, which protrudes from the nozzle outlet port 41b into the mixing section 42, so that a cross-sectional area of the nozzle jet flow A gradually increases as shown in FIG. 5A. The boundary between the nozzle jet flow A and the low-pressure refrigerant flow is changed in accordance with the operating condition of the ejector cycle, so that an expansion mode, which is near the appropriate expansion mode, can be obtained. Besides, the ejector cycle can be operated while keeping high efficiency of the ejector cycle, regardless of fluctuation of the thermal load.

In the first embodiment, a diffuser section, in which refrigerant flow speed is increased, is not formed in the nozzle 41. Therefore, manufacturing process of the nozzle 41 can be reduced.

In this embodiment, the nozzle outlet port 41b is formed to have the minimum section (throttle section) in the refrigerant passage area of the nozzle 41. On the contrary, in the Laval nozzle, the minimum section (throttle section) of the refrigerant passage area needs to be formed in a midstream of a refrigerant passage. Therefore, in this embodiment, workability is enhanced and tolerance can be easily controlled in manufacturing the nozzle 41, compared with the Laval nozzle. Therefore, manufacturing cost of the nozzle can be effectively reduced in first embodiment.

Generally, in the Laval nozzle, an expansion angle of the diffuser section is manufactured to be 1°-2° for preventing a flow separated from the inner surface of the diffuser section, and for improving a high nozzle efficiency. Therefore, the diffuser section needs to be manufactured precisely in the Laval nozzle. The nozzle efficiency is a ratio of kinetic energy of nozzle jet flow to expansion energy of refrigerant. On the contrary, in the first embodiment, high nozzle efficiency can be obtained by the nozzle structure described above, while precise manufacturing is not necessarily needed, as compared with the Laval nozzle.

In the first embodiment of the present invention as described above, the nozzle jet flow A flows along with the needle 44 protruded from the nozzle outlet port 41b into the mixing section 42, so that the cross-sectional area of the nozzle jet flow A gradually increases. The jet flow boundary A0 between the nozzle jet flow A and the low-pressure refrigerant flow is changed in accordance with the operating condition such as the pressure difference, so that the substantially appropriate expansion can be performed. Besides, the ejector cycle can be operated while keeping high efficiency of the ejector cycle, regardless of the inlet pressure and the outlet pressure. Besides, the nozzle jet flow A is automatically changed in accordance with the operating condition, so that the substantially appropriate expansion can be performed. The single kind of the nozzle can be used in the ejector cycle while keeping high efficiency of the ejector cycle, regardless of the specific refrigerating capacity and design pressure condition.

The taper angle $\phi 2$ of the conically tapered section 44a of the needle 44 can be changed from a root section of the needle 44 to the tip end of the needle 44. Specifically, the root section of the needle 44 is a section of the conically tapered section 44a, which is located on the upstream side of the refrigerant flow, i.e., on the side of the cylindrical section of the needle 44 with respect to the tip end of the needle 44.

Second Embodiment

Figure 6:
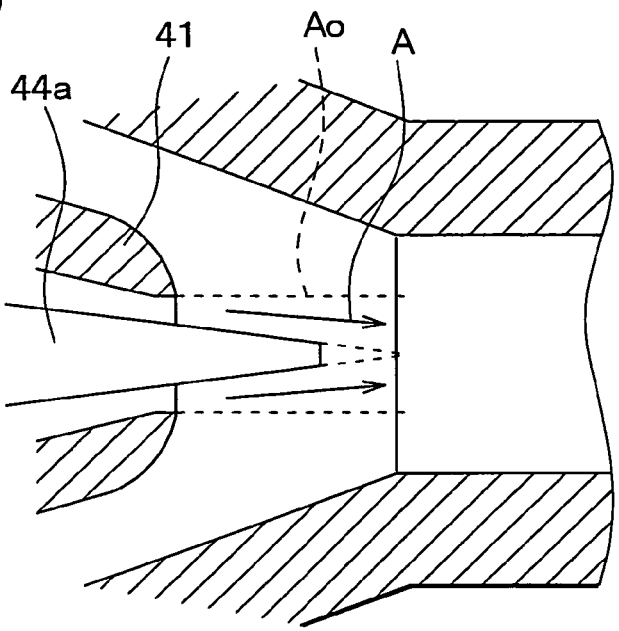
FIG. 6 is an enlarged schematic cross-sectional view showing a needle and a nozzle in an ejector according to a second embodiment in the present invention.
Figure 7:
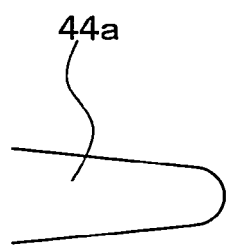
FIG. 7 is an enlarged schematic cross-sectional view showing the needle according to the second embodiment.
Figure 8:
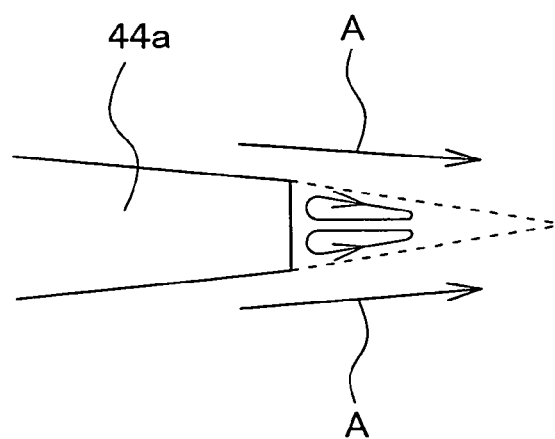
FIG. 8 is an enlarged schematic view showing the needle and a circulation flow generated at a downstream side of the needle according to the second embodiment.

The second embodiment of the present invention will be now described with reference to FIGS. 6-8. As shown in FIGS. 6 and 7, the tip end section of the conically-tapered section 44a is formed in a flat shape or a substantially hemispherical shape, in the second embodiment.

The tip end section of the conically-tapered section 44a of the needle 44 is arranged in the nozzle jet flow A. The tip end section of the conically-tapered section 44a is apt to be eroded due to cavitation in the nozzle jet flow A. Therefore, the small-diametrical tip end section of the conically-tapered section 44a is apt to be scraped due to erosion, and the tip end section can be easily deformed. Besides, it is difficult to manufacture the extraordinarily thin tip end section of the conically-tapered section 44a. Therefore, manufacturing cost of the needle 44 may be increased.

On the contrary, in the second embodiment as shown in FIGS. 6 and 7, the thin tip end section of the conically-tapered section 44a is removed, so as to be formed into the flat shape or the substantially-hemispherical shape, so that workability of the conically-tapered section 44a is enhanced. Therefore, the tip end section of the conically-tapered section 44a can be restrained from deformation due to erosion.

As described above, the nozzle jet flow A flows at a high speed (e.g., over 100 m/s), along the surface of the needle 44. As shown in FIG. 8, small circulation flow (vortex flow) is generated around the tip end section of the conically-tapered section 44a, when the conical tip end section is not formed in the needle 44. However, nozzle jet flow A does not substantially change, even the conical tip end section is not formed in the needle 44, compared with the case in that the sharp tip end section of the conically-tapered section 44a is formed.

The nozzle jet flow A does not greatly change, regardless of providing the sharp tip end section of the nozzle 44. Therefore, the ejector cycle can be operated while keeping high-nozzle efficiency, even when the needle 44 in the second embodiment (i.e., the needle 44 without the sharp tip end section) is used in the nozzle 41.

Third Embodiment

Figure 9:
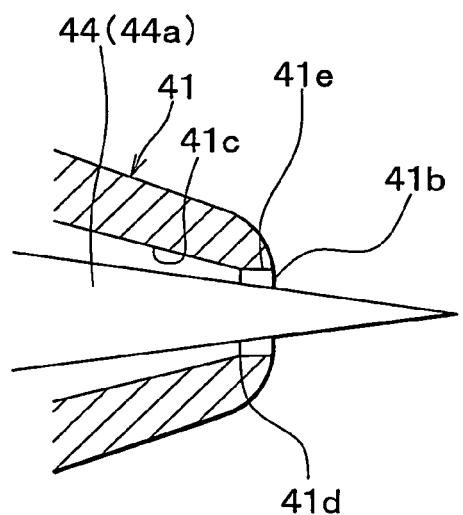
FIG. 9 is an enlarged schematic cross-sectional view showing a needle and a nozzle in an ejector according to a third embodiment of the present invention.

The third embodiment of the present invention will be now described with reference to FIG. 9. As shown in FIG. 9, a straight section 41e is formed in the nozzle 41 at a downstream end area, in the third embodiment. A cross-sectional area (radial inner dimension) of the straight section 41e becomes substantially constant. Specifically, the straight section 41e is formed between the nozzle outlet port 41b, and a throat section 41d, where the cross-sectional area of the flow passage is mostly reduced.

The nozzle outlet port 41b is a section where the radial inner dimension is mostly reduced in the tapered nozzle. However, in a case the tapered nozzle section 41c is manufactured by a machining work, if a total feed degree of a working machine changes in the machining work, the diameter of the nozzle outlet port 41b changes depending on the total feed degree of the working machine. If the nozzle 41 is formed by casting, finishing process is needed to the cast nozzle 41 by an additional machining work. Even in this case, the diameter of the nozzle outlet port 41b changes depending on the variation of the total feed degree of the working machine in the machining work.

On the contrary, in the third embodiment, the straight section 41e is formed on the downstream end area on the side of the nozzle outlet port 41b. The total feed degree of the cutting tool of the working machine can change in the machining process of the taper section. Even in this case, the inner diameter of the straight section 41e becomes the inner diameter of the nozzle section 41c at the most reduced cross-sectional area (throttle section) in the flow passage, as long as the straight section 41e exists. Here, the inner diameter of the nozzle section 41c at the throttle section is substantially same as the inner diameter of the throat section 41d. Accordingly, variation of the inner diameter of the nozzle section 41c at the throttle section can be easily controlled, so that manufacturing process of the nozzle 41 can be significantly reduced.

When the straight section 41e is formed on the side of the nozzle outlet port 41b, the throttle section is set at a connection section where the straight section 41e is connected to the downstream end of the tapered nozzle section 41c. Therefore, the passage sectional area gradually increases from the downstream end of the tapered nozzle section 41c, as refrigerant flows toward the nozzle outlet port 41b. The passage sectional area is formed by the outer peripheral surface of the conically-tapered section 44a and the straight section 41e in the nozzle 41. Further, the inner diameter of the straight section 41e is substantially constant and the cross-sectional area of the conically-tapered section 44a gradually decreases toward the downstream side. Therefore, the passage sectional area in the straight section 41e increases toward the downstream end side.

Therefore, refrigerant starts expansion and boiling in the straight section 41e. Accordingly, if the straight section 41e is excessively long, a dimensionless number D (passage sectional area in the straight section/sectional area of the throat portion) becomes excessively large. In this case, the refrigerant in the straight section 41e excessively expands, and nozzle efficiency of the nozzle 41 decreases. Accordingly, the length of the straight section 41e needs to be set at a predetermined length, such that the excessive expansion does not cause in the straight section 41e. Even in the third embodiment, because the conically-tapered section 44a of the needle 44 protrudes from the nozzle outlet port 41b, the advantages similar to the first embodiment can be obtained.

Fourth Embodiment

Figure 10:
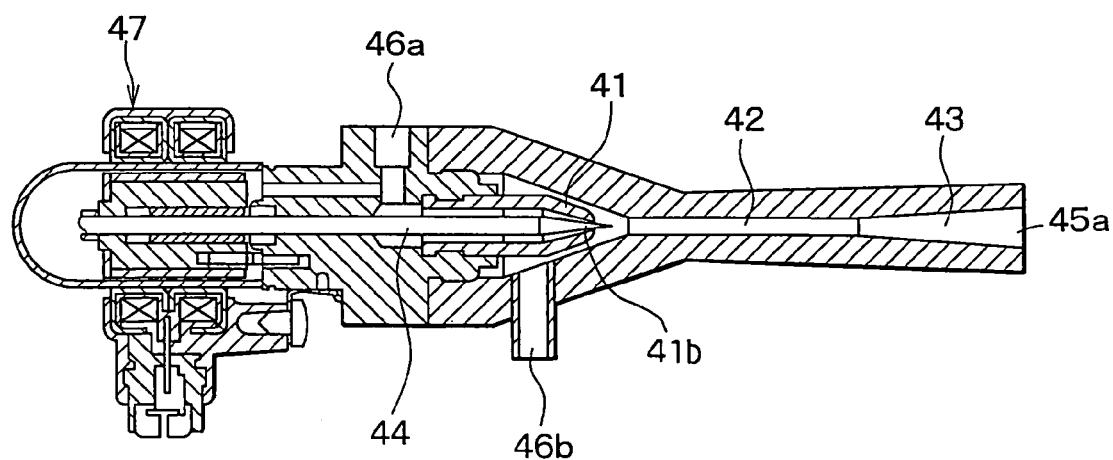
FIG. 10 is a schematic cross-sectional view showing an ejector according to a fourth embodiment of the present invention.

The fourth embodiment of the present invention will be now described with reference to FIGS. 10-12. As shown in FIG. 10, an actuator 47 is provided for displacing the needle 44 in the axial direction of the needle 44, in this embodiment. The needle 44 is displaced in accordance with a flow amount of high-pressure refrigerant flowing into the nozzle 41, so that a substantial opening degree of the nozzle outlet port 41b is controlled and varied.

A stepping motor is used for the actuator 47 in this embodiment. The needle 44 is displaced in the axial direction of the needle 44 in accordance with a rotating degree of the stepping motor.

Refrigerant flows into the nozzle 41, and refrigerant speed is increased up to the sound speed in the nozzle 41 in this embodiment. Accordingly, a flow rate of the refrigerant passing through the nozzle 41 is not significantly affected by refrigerant condition on the low-pressure side in the ejector 40.

A flow rate of the refrigerant passing through the nozzle 41 has a proportional relationship with a value that is calculated by multiplying the cross-sectional area of a throat section in the nozzle 41 and pressure of the refrigerant flowing into the nozzle 41. Here, the throat section in the nozzle 41 has the least cross-sectional area in the refrigerant flow passage of the nozzle 41. When the thermal load of the ejector cycle is changed, the operating condition of the ejector cycle is changed. In this case, the flow rate of the high-pressure refrigerant and the pressure of the high-pressure refrigerant are changed. Accordingly, a passage sectional area needed for the throat section is changed.

Figure 11A:
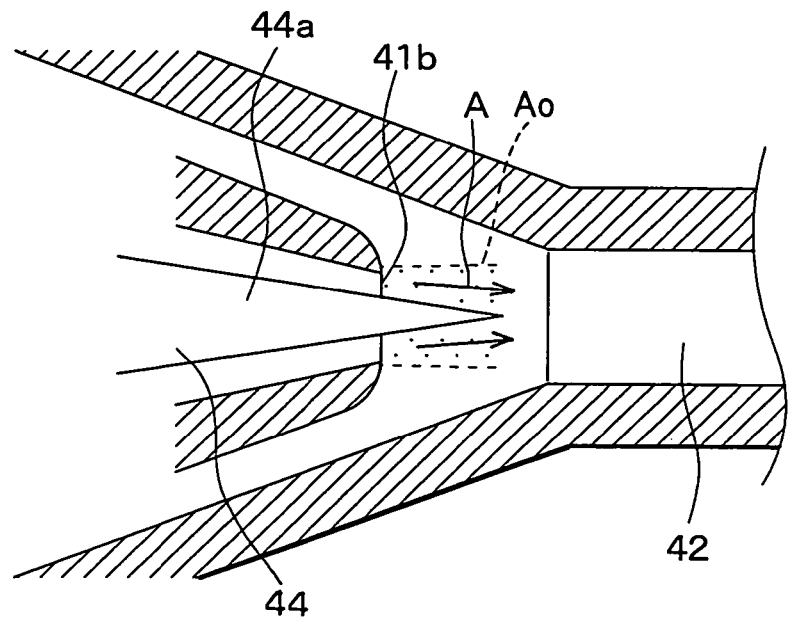
FIGS. 11A and 11B are enlarged schematic cross-sectional views showing jet flows A of high-pressure refrigerant from a nozzle of the ejector according to the fourth embodiment when a flow rate of the high-pressure refrigerant is changed.

In the fourth embodiment, the needle 44 is displaced, and the passage sectional area of the throat section is changed, so that an appropriate passage sectional area of the throat section can be constantly kept. Thus, the ejector cycle can be efficiently operated. In detail, as shown in FIG. 11A, the passage sectional area of the throat section 44b is increased by the needle valve 44 when the high-pressure refrigerant flow rate is increased. On the contrary, as shown in FIG. 11B, the passage sectional area of the throat section 44b is decreased by the needle valve 44 when the high-pressure refrigerant flow rate is decreased.

In the fourth embodiment, when the needle 44 is displaced to the opposite side of the mixing section 42 as shown in FIG. 11A, the passage sectional area of the throat section (i.e., cross-sectional area of the nozzle jet flow A) is increased. In this situation, a relative cross-sectional area of the needle 44 in the nozzle jet flow A at the nozzle outlet 44b becomes small, with respect to the total cross-sectional area of the nozzle jet flow A. Accordingly, cross-sectional area of the nozzle jet flow A does not largely change, while the nozzle jet flow A flows along with the surface of the needle 44 to the downstream side of the nozzle outlet port 41b. That is, expansion degree of the cross-sectional area of the nozzle jet flow A becomes small at the nozzle outlet port 41b. In this case, pressure drop of the nozzle jet flow A is small at the nozzle outlet port 41b. Therefore, when the opening degree of the throat section (nozzle outlet port 41b) is larger, the pressure difference between the nozzle jet flow A and the low-pressure refrigerant drawn toward the mixing section 42 from the evaporator 30 becomes large at the nozzle outlet port 41b. Accordingly, as described above, the boundary face A0 of the nozzle jet flow A expands at the nozzle outlet port 41b (throat section).

Figure 11B:
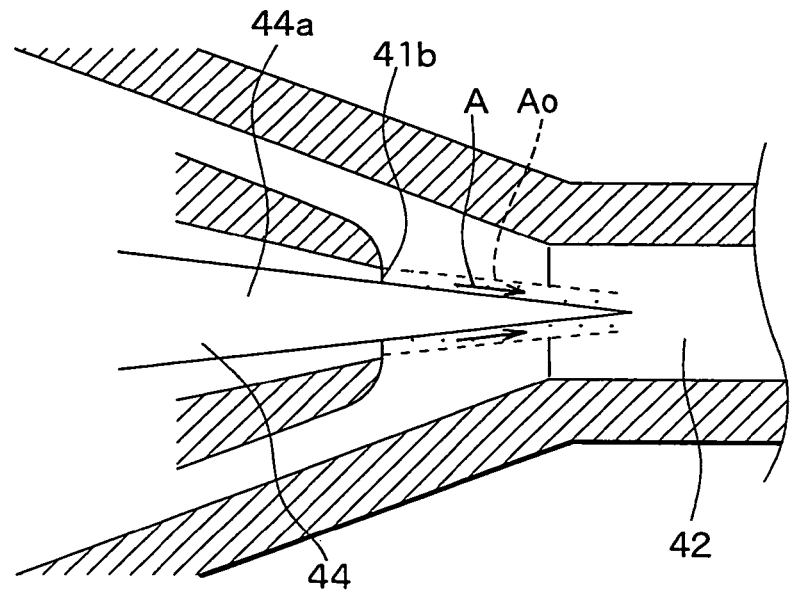

On the contrary, when the needle 44 is displaced to the side of the mixing section 42 as shown in FIG. 11B, the passage sectional area of the throat section (nozzle outlet port 41b) is decreased. In this situation, the relative cross-sectional area of the needle 44 in the nozzle jet flow A at the nozzle outlet 41b becomes large, with respect to the total cross-sectional area of the nozzle jet flow A. Accordingly, cross-sectional area of the nozzle jet flow A largely changes, while the nozzle jet flow A is formed along with the surface of the needle 44 to the downstream side of the nozzle outlet port 41b. That is, expansion degree of the cross-sectional area of the nozzle jet flow A becomes large at the nozzle outlet port 41b. In this case, pressure drop of the nozzle jet flow A becomes large at the nozzle outlet port 41b. Therefore, when opening degree of the throat section (nozzle outlet port 41b) is small, the pressure difference between the nozzle jet flow A and the low-pressure refrigerant drawn from the evaporator 30 toward the mixing section 42 becomes small at the nozzle outlet port 41b. Because the high-pressure refrigerant is decompressed due to the pressure drop at the nozzle outlet port 41b, pressure of the high-pressure side refrigerant becomes closer to the pressure of the low-pressure refrigerant. Accordingly, as described above, the boundary face A0 of the nozzle jet flow A is not apt to expand at the nozzle outlet 41b.

Therefore, in this embodiment, the shape of the nozzle jet flow automatically changes in accordance with the changing of the passage sectional area of the throat section (nozzle outlet) 41b. Accordingly, the refrigerant flow-passage sectional area in the nozzle outlet port 41b automatically changes in accordance with the change of the cross-sectional area of the throat section.

Figure 21:
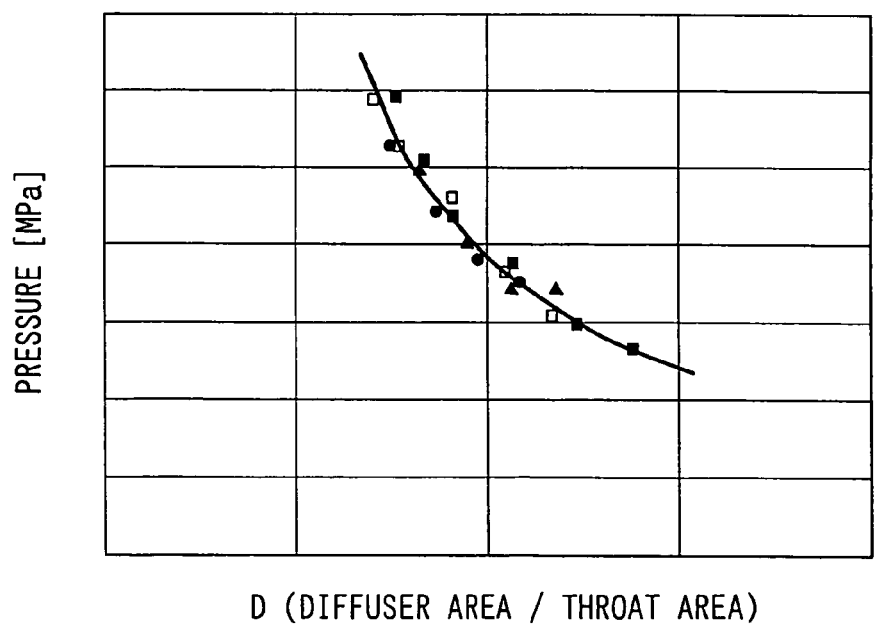
FIG. 21 is a graph showing a relationship between a pressure in the variable ejector and a dimensionless number D (diffuser passage area/throat area), when the throttle area is changed.

For example, when pressure of refrigerant flowing into the nozzle 41 is constant, the dimensionless number D (FIG. 21) becomes constant, in the appropriate expansion mode. Here, the dimensionless number D is calculated by dividing cross-sectional area of the flow passage in the nozzle 41 by cross-sectional area of the throat section. Therefore, in this embodiment, the dimensionless number D can be retained to be constant regardless of the refrigerant amount flowing into the nozzle 41. Therefore, efficiency of the ejector can be constantly retained at a high degree.

Figure 12:
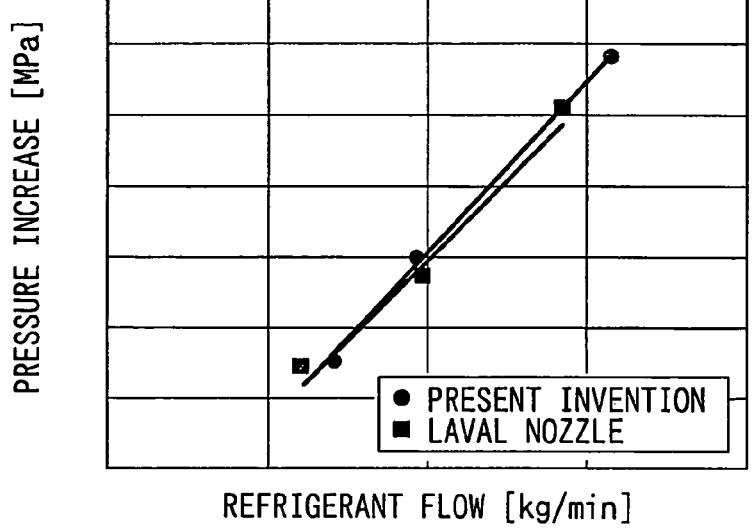
FIG. 12 is a graph for explaining a characteristic of the ejector in the fourth embodiment, compared with a characteristic of an ejector having a Laval nozzle.

A relationship between a pressurizing degree in the ejector and a refrigerant flow amount in the nozzle are shown in FIG. 12, with respect to the case of the nozzle 41 in this embodiment and the case of different kinds of the Laval nozzles which are optimized for each operating condition.

Here, the single nozzle 41 and the single needle 44 are used in the ejector 40 in this embodiment, and only the relative position between the nozzle 41 and the needle 44 is changed in the experiment in FIG. 12.

The ejector in this embodiment can produce performance equivalent to the Laval nozzles optimized for each operating condition. Therefore, the single nozzle 41 and the single needle 44 can adapt to the changing of the operation condition in this embodiment.

Fifth Embodiment

Figure 13:
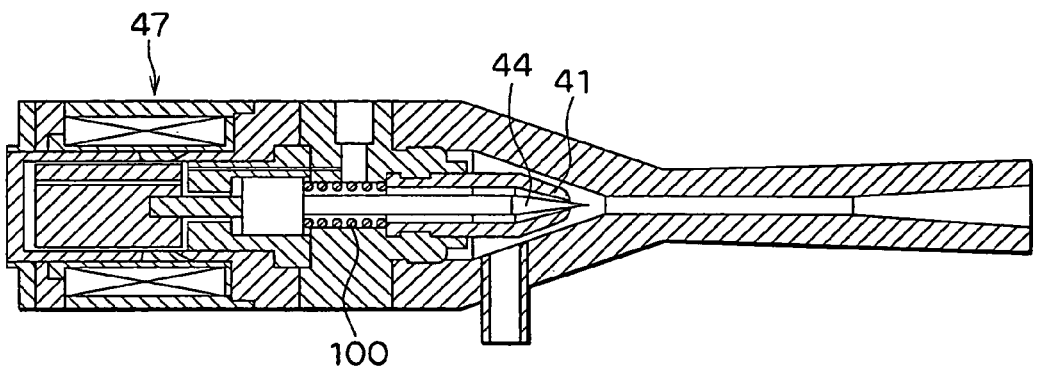
FIG. 13 is a schematic cross-sectional view showing an ejector according to a fifth embodiment of the present invention.

The fifth embodiment of the present invention will be now described with reference to FIGS. 13 and 14. As shown in FIG. 13, a proportional solenoid is applied to the actuator 47 in this embodiment.

Engine rotation speed changes in accordance with a driving load in a vehicle. Therefore, the rotation speed of the compressor 10 can be suddenly changed when the compressor 10 is driven by a driving engine of the vehicle, even air conditioning load is not changed. The needle 44 needs to be quickly displaced, so that the sudden change of the rotation speed of the compressor 10 can be quickly absorbed.

The proportional solenoid is used for actuating the needle 44 in this embodiment. The proportional solenoid has more quick response characteristic compared with the stepping motor in the fourth embodiment.

Figure 14:
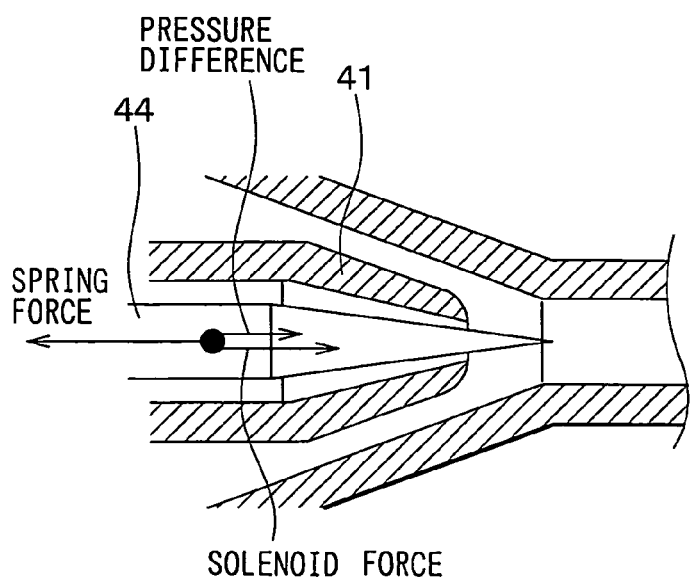
FIG. 14 is an enlarged schematic cross-sectional view showing a needle and a nozzle in the ejector according to the fifth embodiment.

As shown in FIG. 14, a magnetic field is generated and controlled in a solenoid coil of the proportional solenoid in this embodiment. In detail, electromagnetic force (solenoid force) is controlled, so that the solenoid force and a pressure difference between the high-pressure refrigerant flow and the low-pressure refrigerant flow around the nozzle 41 are balanced, so that the position of the needle 44 is set.

The spring force of a spring 100 in the ejector 40 is preliminary determined in this embodiment, so that the nozzle outlet port 41b is not closed by the needle 44 even when the pressure difference around the nozzle 41 (specifically, around nozzle outlet port 41b) becomes maximum.

Sixth Embodiment

Figure 15:
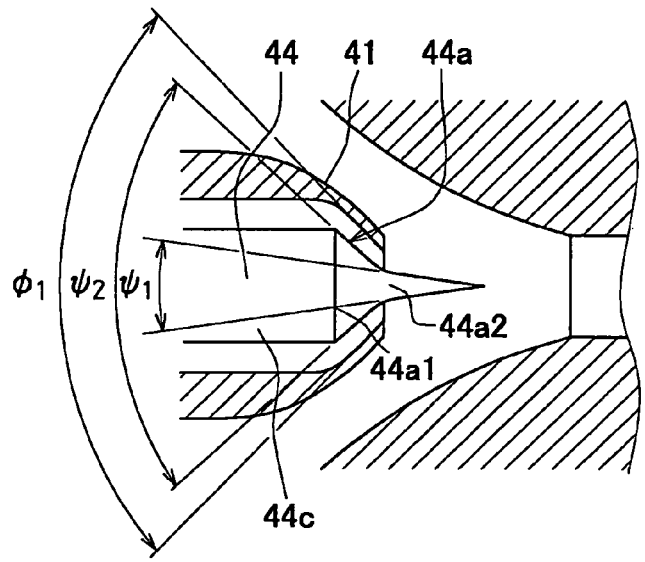
FIG. 15 is an enlarged schematic cross-sectional view showing a needle and a nozzle in an ejector according to a sixth embodiment of the present invention.

The sixth embodiment of the present invention will be now described with reference to FIGS. 15-17. In the above-described embodiments, the taper angle of the conically tapered section 44a of the needle 44 is constant from the root section of the needle 44 to the tip end section of the needle 44. As shown in FIG. 15, in the sixth embodiment, the tapered section 44a is constructed with a root section 44a1 adjacent to a cylindrical section 44c, and an end side section 44a2. A taper angle φ1 of the end side section 44a2 of the needle 44 is predetermined to be smaller than a taper angle φ2 of the root section 44a1 of the needle 44 in this embodiment. Here, the root section 44a1 of the needle 44 is located on the side of the cylindrical section 44c of the needle 44 with respect to the end side section 44a2 of the needle 44. That is, the taper angle of the tapered section 44a is changed from φ1 to φ2 between the tip end section 44a2 and the root section 44a1 in the tapered section 44a of the needle 44.

Here, the taper angle φ2 of the root section 44a1 of the needle 44 is an angle of a section in which the cross-sectional area of the tapered section 44a (root section 44a1) of the needle 44 becomes maximum. The root section 44a1 of the needle 44 is located on the axially opposite side of the end side section 44a2 of the tapered section 44a of the needle 44.

A variation of the passage sectional area (throat section area) of the throat section of the nozzle 41 can be increased with respect to a displacement amount of the needle 44, compared with those in the fourth embodiment and the fifth embodiment. Therefore, displacement range of the needle 44 can be decreased, so that the ejector 40 can be downsized.

Figure 16:
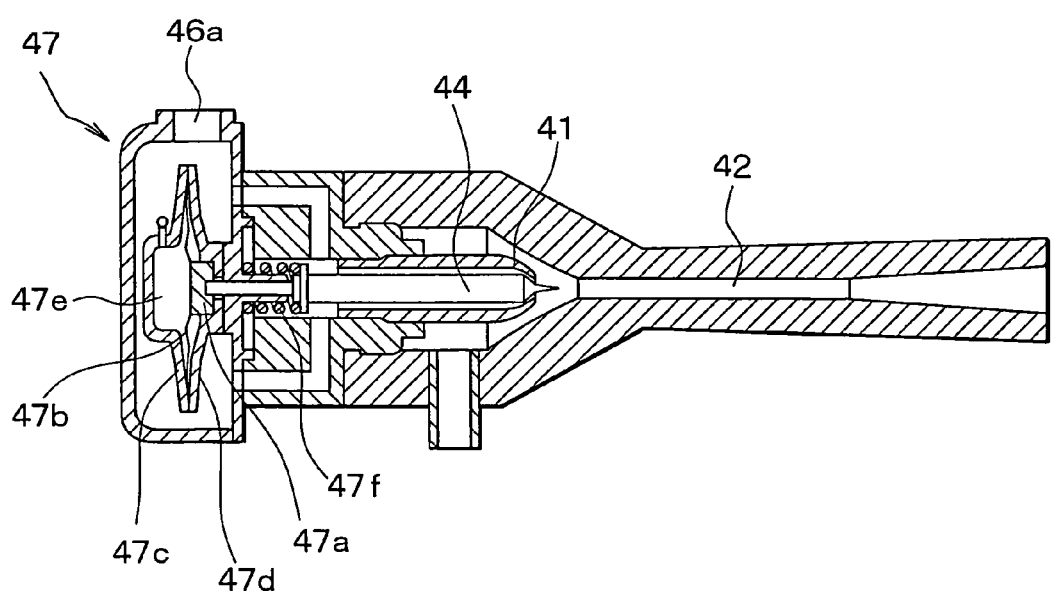
FIG. 16 is a schematic cross-sectional view showing the ejector according to the sixth embodiment.
Figure 17:
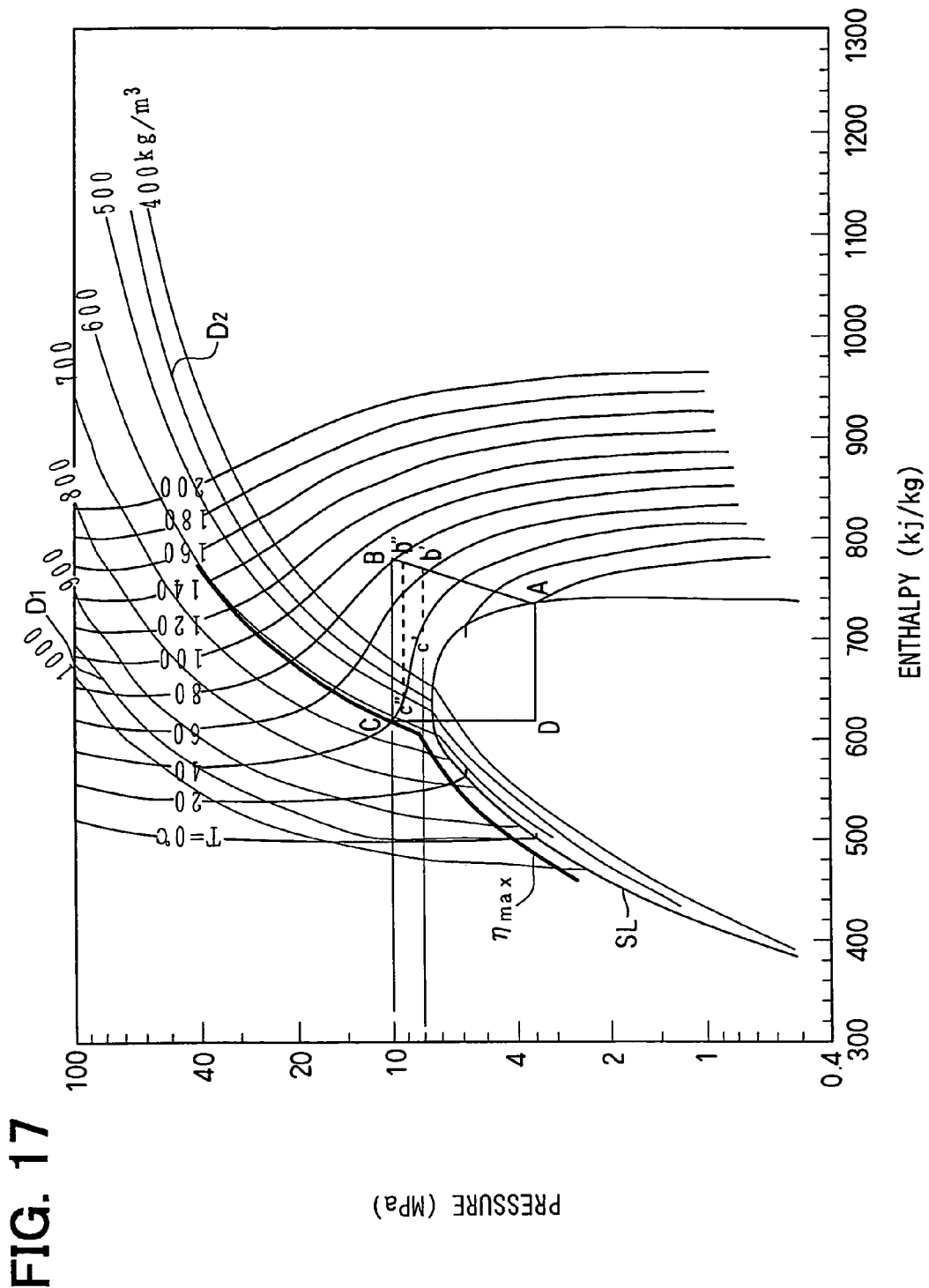
FIG. 17 is a p-h diagram according to the present invention.

As shown in FIG. 16, a mechanical actuator is used for the actuator 47, in this embodiment. The mechanical actuator axially displaces the needle 44 in accordance with temperature of high-pressure refrigerant. A displacement range of the needle 44 can be decreased, if the mechanical actuator is used in the ejector 40.

The actuator 47 in the sixth embodiment has a substantially same structure as that of the actuator disclosed in JP-A-9-264622. Specifically, a member 47a is connected with the needle 47 on one side, and also connected with a diaphragm 47b on the other side. The needle 44 is axially displaced in accordance with the movement of the diaphragm 47b.

The diaphragm 47b is inserted between a first case 47C and a second case 47d. The outer peripheral section of both the first case 47C and the second case 47d is welded and joined each other, so that a closed space 47e is formed between the first case 47C and the diaphragm 47b. Refrigerant is included in the closed space 47e. Carbon dioxide is used for the refrigerant in this embodiment, and is sealed in the closed space 47e. The density of the refrigerant in the closed space 47e is about 600 kg/m3, for example. The needle 44 is urged by a coil spring 47f in a direction in which the needle 44 closes the nozzle 41.

When pressure of high-pressure refrigerant becomes less than the critical pressure of the refrigerant, the high-pressure refrigerant becomes in two-phase flow including gas refrigerant flow and liquid refrigerant flow. In this case, temperature of the refrigerant in the closed space 47e becomes equivalent to the temperature of the two-phased high-pressure refrigerant around the closed space 47e in the actuator 47.

Pressure (saturation pressure at the temperature of the high-pressure refrigerant) of the closed space 47e becomes equivalent to the pressure of the high-pressure refrigerant. In this situation, the coil spring 47f pulls both the member 47a and the diaphragm 47b toward the side of the needle 44 (right side in FIG. 16). The volume of the closed space 47e defined by the diaphragm 47b and the first case 47c increases, so that pressure in the closed space 47e decreases and temperature of the refrigerant in the closed space 47e also decreases. That is, super cool degree of the refrigerant in the closed space 47e is secured by the urging force of the coil spring 47f.

The urging force of the coil spring 47f is about 0.6 MPa which is a converted pressure calculated to correspond to the pressure at the diaphragm 47b. 0.6 MPa is equivalent to a pressure of a super-cool degree of 5° C. when the pressure of the high-pressure refrigerant is less than the critical pressure of the refrigerant.

Next, the operation of the actuator 47 is described.

High-pressure refrigerant flows from the high-pressure refrigerant inlet 46a into the actuator 47, around the first case 47c and the second case 47d. Temperature of the refrigerant in the closed space 47e becomes substantially same as the temperature of the high-pressure refrigerant around the closed space 47e. In this case, the temperature of the refrigerant in the closed space 47e and the pressure in the closed space 47e change along with the isopycnic line of 600 kg/m3 shown in FIG. 17.

When temperature of the refrigerant in the closed space 47e is 40° C., the pressure in the closed space 47e becomes about 9.7 MPa, for example. If the pressure of the high-pressure refrigerant is less than 10.3 MPa, the diaphragm 47b is pulled to the side of the needle 44, so that the needle 44 moves in a direction for closing the nozzle 41. Here, the pressure (10.3 MPa) is calculated by addition of the pressure (9.7 MPa) of the refrigerant in the closed-space 47e and the urging force (0.6 MPa) of the coil spring 47f. That is, the total force of the pressure in the closed space 47e and the urging force of the coil-spring 47f is greater than the pressure of the high-pressure refrigerant in the actuator 47. In this case, the diaphragm 47e is pulled to the side of the nozzle 41, and the needle 44 is displaced toward the mixture section 42 (right side in FIG. 16).

On the contrary, if the pressure of the high-pressure refrigerant is greater than 10.3 MPa, the diaphragm 47b is pulled to the opposite side of the needle 44, so that the needle 44 moves in a direction for opening the nozzle 41. Thus, the opening degree of the nozzle 41 is automatically controlled, so that the pressure of the high-pressure refrigerant is controlled at about 10.3 MPa.

The displacement amount of the needle 44 by the diaphragm 47b cannot set at a large value compared with the stepping motor and the proportional solenoid. Generally, the displacement amount of the needle 44 is less than 1 mm when the diaphragm 47b is used in the actuator 47.

Seventh Embodiment

Figure 18:
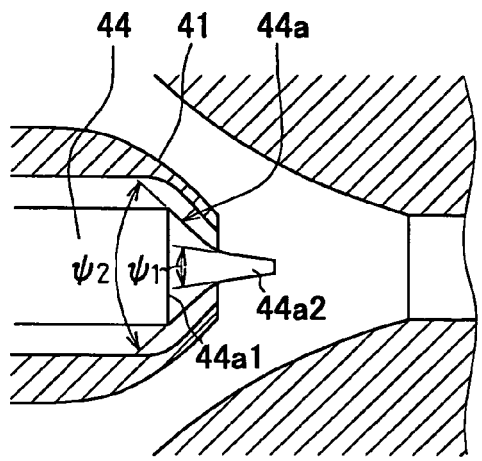
FIG. 18 is an enlarged schematic cross-sectional view showing a needle and a nozzle in an ejector according to a seventh embodiment of the present invention.
Figure 19A:
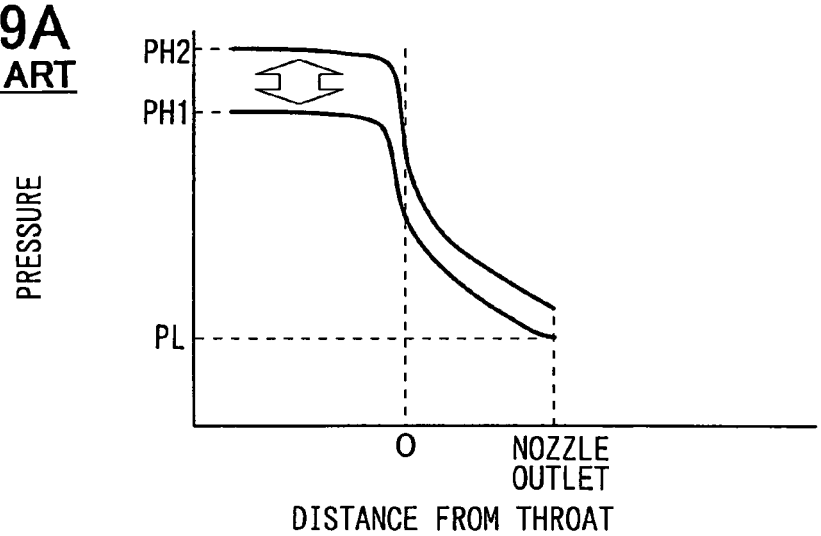
FIG. 19A is a graph showing a relationship between a pressure in a Laval nozzle and a distance from a throat section when a pressure condition is changed in an inlet port of the Laval nozzle.
Figure 19B:
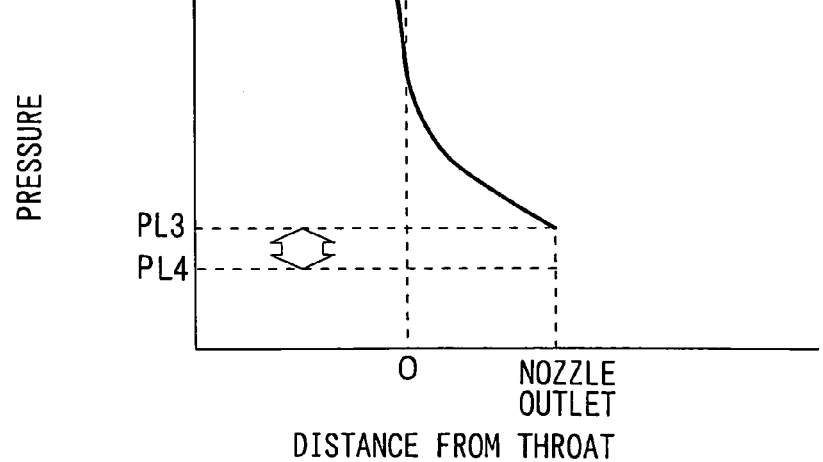
FIG. 19B is a graph showing a relationship between a pressure in the Laval nozzle and the distance from the throat section when a pressure condition is changed in an outlet port of the Laval nozzle.
Figure 20:
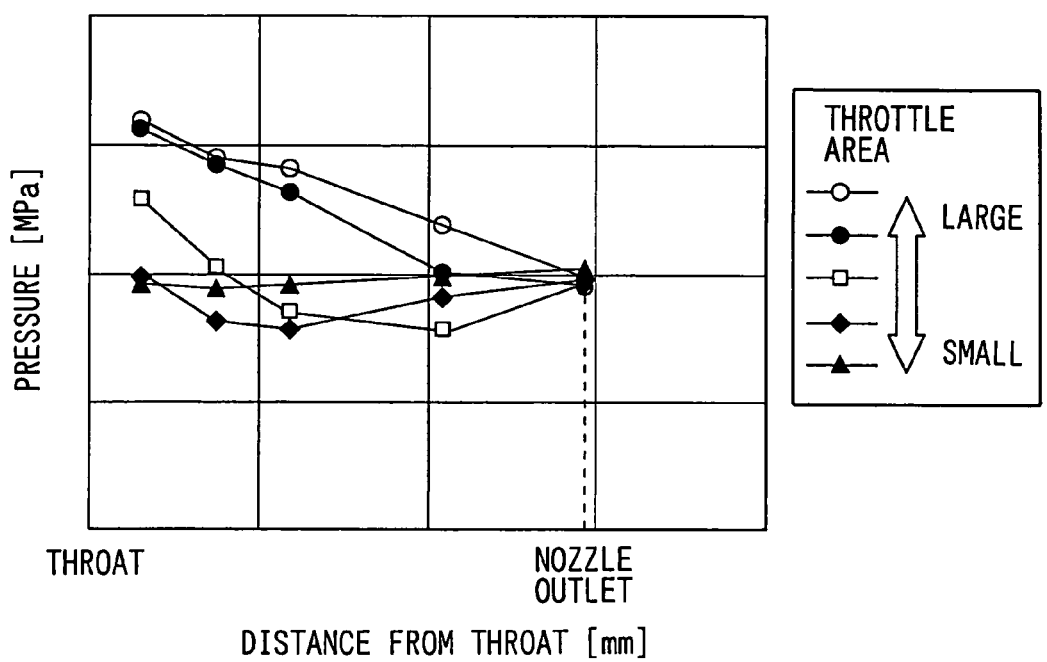
FIG. 20 is a graph showing a relationship between a pressure in a variable ejector and a distance from a throat section when a throttle area is changed.

The seventh embodiment of the present invention will be now described with reference to FIG. 18. A modification of the needle 44 in the sixth embodiment is described in this embodiment. Specifically, as shown in FIG. 18, the tip end of the end side section 44a2 of the conically tapered section 44a is formed in a flat shape or a substantially hemispherical shape. Besides, the conically tapered section 44a is formed, such that the taper angle φ1 of the end side section 44a2 of the needle 44 becomes smaller than the taper angle φ2 of the root section 44a1 of the needle 44. In the seventh embodiment, the other parts are similar to those of the above-described sixth embodiment.

Other Embodiments

Although the present invention has been fully described in connection with the preferred embodiments thereof with reference to the accompanying drawings, it is to be noted that various changes and modifications will become apparent to those skilled in the art.

For example, the ejector 40 of the present invention is used in a vehicle air-conditioner in the embodiments described above. However, the present invention is not limited to the use in a vehicle air-conditioner, and can be used in other ejector cycles, such as a refrigerator, a freezer and a hot water serving system for the other use.

The actuator 47 is not limited to the embodiments described above. The actuator 47 can be a mechanical actuator using inert-gas pressure, liquid pressure, a motor and a gear, for example. Besides, an electrical actuator, such as a non-electromagnetic actuator using a piezo-electric device, can be used.

In the above-embodiments, carbon dioxide is used for the refrigerant, and pressure of the high-pressure refrigerant is set to be greater than the critical pressure of the refrigerant. However, Freon (R134a) gas can be used for refrigerant, so that the pressure of the high-pressure refrigerant is set to be less than the critical pressure of the refrigerant. Further, at least two of the embodiments described above can be combined.

The conically tapered section 44a can be formed, such that the taper angle φ1 of the end side section 44a2 of the needle 44 becomes larger than the taper angle φ2 of the root side section 44a1 of the needle 44. In addition, the taper angle φ1 of the end side section 44a2 and the taper angle φ2 of the root side section 44a1 can be varied, so that nozzle efficiency can be improved.

Such changes and modifications are to be understood as being within the scope of the present invention as defined by the appended claims.

What is claimed is:

1. A vapor compression refrigerant cycle comprising:
a compressor for compressing refrigerant;
a radiator for cooling high-pressure refrigerant discharged from the compressor;
an evaporator for evaporating the refrigerant;
an ejector having a nozzle for decompressing the high-pressure refrigerant from the radiator, and a housing which surrounds the nozzle to define a flow passage through which a low-pressure refrigerant from the evaporator is drawn and extends downstream of the nozzle to define a mixing portion in which a nozzle jet flow of the high-pressure refrigerant from an outlet port of the nozzle and the low-pressure refrigerant drawn are mixed, wherein:
the nozzle includes
the outlet port from which the nozzle jet flow is jetted, and a nozzle tapered section located at an upstream side of the outlet port, wherein the nozzle tapered section has an inner passage with a radial dimension reduced toward the outlet port; and wherein the ejector further comprises:
a needle having a needle tapered section disposed in the inner passage, the needle tapered section having a cross sectional area reduced toward a downstream end of the needle; wherein
the needle is supported such that the downstream end of the needle is always positioned downstream with respect to the outlet port of the nozzle between a small flow amount and a large flow amount jetted from the outlet port; and
the nozzle tapered section has a taper angle (φ1) which is equal to or larger than a taper angle (φ2) of the needle tapered section; and wherein
the flow passage defined inside the housing has an inlet angle (φ) set equal to or less than 40 degrees, and
the outlet port, the nozzle tapered section, the needle tapered section and the inlet angle are set to make the nozzle jet flow expanded and boiled so that flow speed of the nozzle jet flow is increased up to the supersonic speed, and a boundary face, which is an outer periphery of the nozzle jet flow, diffused to a position where the nozzle jet flow and the low-pressure refrigerant flowing around the nozzle jet flow balance with each other.

2. The vapor compression refrigerant cycle according to claim 1, wherein:
the nozzle further includes a straight section extending from the outlet port to an upstream side by a predetermined distance;
the straight section has an inner radial dimension that is substantially constant;
the straight section is arranged at a direct downstream side of the nozzle tapered section;
the needle is disposed in the nozzle to define a fluid passage therebetween, and the fluid passage has a throttle section at which a cross-sectional area of the fluid passage becomes smallest; and
the straight section and the nozzle tapered section are connected to each other at the throttle section.

3. The vapor compression refrigerant cycle according to claim 1 wherein:
the needle tapered section includes a root section, and an end section located downstream of the root section; and
the end section has an end section taper angle that is different from a root section taper angle of the root section.

4. The vapor compression refrigerant cycle according to claim 1 wherein:
the needle tapered section includes a root section, and an end section located downstream of the root section; and
the end section has an end section taper angle that is smaller than a root section taper angle of the root section.

5. The vapor compression refrigerant cycle according to claim 1, wherein the needle tapered section has a downstream end surface that is formed in one of a substantially hemispherical shape and a flat shape.

6. The vapor compression refrigerant cycle according to claim 1, further comprising an actuator for displacing the needle in an axial direction of the needle.

7. The vapor compression refrigerant cycle according to claim 1, wherein the needle is supported to be fixed in relation to the nozzle.

8. The vapor compression refrigerant cycle according to claim 1, wherein the needle is supported to be movable with respect to the nozzle.

9. The vapor compression refrigerant cycle according to claim 1, wherein the downstream end of the needle always extends past a downstream end of the nozzle.

10. The vapor compression refrigerant cycle according to claim 1, wherein the needle always extends completely through the nozzle.

11. The vapor compression refrigerant cycle according to claim 1, further comprising, a gas-liquid separator for separating refrigerant discharged from the ejector Into gas refrigerant and liquid refrigerant, the gas-liquid separator including a gas-refrigerant outlet coupled to a refrigerant suction side of the compressor and a liquid refrigerant outlet coupled to an inlet side of the evaporator.

12. The vapor compression refrigerant cycle according to claim 1, wherein the mixing portion is defined by a generally cylindrical portion of the housing.

13. The vapor compression refrigerant cycle according to claim 1, wherein a length of the mixing section in a direction of refrigerant flow is greater than a length of the needle tapered section of the needle in the direction of refrigerant flow.

* * * * *